US006697493B1

(12) United States Patent
Kern

(10) Patent No.: US 6,697,493 B1
(45) Date of Patent: Feb. 24, 2004

(54) PROCESS AND ARRANGEMENT FOR CONVERTING AN ACOUSTIC SIGNAL TO AN ELECTRICAL SIGNAL

(75) Inventor: Otmar Kern, Berlin (DE)

(73) Assignee: Georg Neumann GmbH, Berlin (DE)

( * ) Notice: Subject to any disclaimer, the term of this patent is extended or adjusted under 35 U.S.C. 154(b) by 0 days.

(21) Appl. No.: 09/155,350

(22) PCT Filed: Jan. 14, 1997

(86) PCT No.: PCT/EP97/00131

§ 371 (c)(1),
(2), (4) Date: Sep. 28, 1998

(87) PCT Pub. No.: WO97/36454

PCT Pub. Date: Oct. 2, 1997

(30) Foreign Application Priority Data

Mar. 27, 1996 (DE) .......................................... 196 12 068

(51) Int. Cl.[7] ............................ H04R 3/00; G06F 17/00
(52) U.S. Cl. .......................................... 381/111; 700/94
(58) Field of Search ............................ 381/111; 700/94

(56) References Cited

U.S. PATENT DOCUMENTS 5,181,032 A 1/1993 Ribner ....................... 341/143
5,191,332 A 3/1993 Shieu ......................... 341/143
6,285,769 B1 9/2001 Edelson et al. ............... 381/95
6,427,014 B1 * 7/2002 Eastty ........................ 381/111

FOREIGN PATENT DOCUMENTS

EP 0544647 A2 6/1993
GB 2077074 A 12/1981

OTHER PUBLICATIONS

Herrfeld, W., "Delta–Sigma–A/D–Wandler," Audio Professional, 3/4, 1995, pp. 59–65.

* cited by examiner

*Primary Examiner*—Forester W. Isen
*Assistant Examiner*—Elizabeth McChesney
(74) *Attorney, Agent, or Firm*—Venable LLP; Robert Kinberg; Jeffrey W. Gluck

(57) ABSTRACT

To facilitate direct conversion to digital form of an acoustic signal acting on the acoustic receptor of an acoustic receiver while satisfying requirements of dynamic range, noise and adequate quantization, the following is proposed: the acoustic receptor should be exposed to a counter-signal when the acoustic signal acts on it in such a way that the acoustic receptor is largely maintained in its rest state despite the action of the acoustic signal. The counter-signal is derived from the control variable of a control circuit which is a component of the acoustic receptor. The control variable contains the information on the acting acoustic signal. Any deviation of the receptor from its rest state immediately generates a digital "nought" or "one."

38 Claims, 4 Drawing Sheets

PROCESS AND ARRANGEMENT FOR CONVERTING AN ACOUSTIC SIGNAL TO AN ELECTRICAL SIGNAL

BACKGROUND OF THE INVENTION

1. Field of the Invention

The invention relates to a sound receiving process and to a sound receiving arrangement.

2. Description of Related Art

Efforts made so far to design a "true" digital microphone without analog intermediate step have not proceeded past theoretical ideas. On the basis of these ideas, the position or movement of a sound receptor (e.g. a diaphragm) for an electroacoustic sound source is measured, either optically or by means of ultrasound, e.g. by evaluating interference patterns or transit time effects, wherein a counting operation is used, among other things, to digitize the measured information. Such a process if disclosed, for example, in the GB-A-1 077 074. The sound is picked up via two sound receptors, which are connected in series acoustically in the direction of the incoming sound. The signal voltages given off both sound receptors are displaced by an amount that follows from the sound transit time between the two sound receptors, which are arranged at a specified distance. By comparing and digitizing these two signals, a 1-bit DPCM signal is generated, which is then transmitted to an up/down counter for conversion to a bit-parallel digital signal.

Converters have in the meantime become available for the purely electrical conversion from analog audio signals to a corresponding digital signal, which for the most part meet the special requirements for converting audio signals. Above all, this refers to a high resolution, linearity and low inherent noise. In particular, Sigma-Delta converters achieve these characteristics, as is disclosed, for example, in the references U.S. Pat. No. 5,181,032 and U.S. Pat. No. 5,191,332. With the known Sigma-Delta converters, the audio signal is fed into a control circuit, wherein the feedback counter-coupling signal is conducted via a 1-bit or a traditional multi-bit AD converter and a corresponding inverse converter. In the generated digital 1-bit or multi-bit data current, the analog audio signal information is represented by the time ratio of the digital 0/1 states. The desired digital output signal is obtained by means of digital filtering and reformatting. Such a control circuit system represents a modulator that is synchronized with a supplied clock pulse, wherein favorable noise and resolution qualities are achieved by splitting the information in the modulator into several signal paths and a varied signal treatment.

However, all known converters for generating a digital signal from an acoustic signal are unsuitable for studio microphones because they cannot compete with analog studio microphones with respect to dynamic range, noise level and sufficient quantization.

SUMMARY OF THE INVENTION

In contrast, it is the object of the invention to specify a process and a sound receiving arrangement, which makes it possible to directly convert an acoustic signal, acting upon the sound receptor of a sound receiver, to a digital information, thereby meeting the requirements with respect to dynamic range, noise and sufficient quantization.

This object and other objects are addressed by the inventive process and apparatus.

In a first embodiment, the invention comprises a process for converting an acoustic signal, acting upon the sound receptor of a sound receiver, to an electrical signal. In the inventive method, if the acoustic signal acts upon the sound receptor, the sound receptor is also acted upon by a counter-signal, such that the sound receptor remains mostly in its resting state. The counter-signal is derived from a control variable of a control circuit of which the sound receiver is a component. The control variable contains information on the acoustic signal, and each deviation of the receptor from its resting state generates digital information ("0" or "1").

In a further embodiment, the invention comprises a sound receiving arrangement. The sound receiving arrangement comprises a sound receiver including a sound receptor. In the inventive sound receiving arrangement, if the acoustic signal acts upon the sound receptor, the sound receptor is also acted upon by a counter-signal, such that the sound receptor remains mostly in its resting state. The counter-signal is derived from a control variable of a control circuit of which the sound receiver is a component. The control variable contains information on the acoustic signal, and each deviation of the receptor from its resting state generates digital information ("0" or "1").

The invention is based on the idea of retaining the capacitive converter principle, unsurpassed so far with respect to dynamic scope and noise behavior, of a "true" digital microphone. The known and mature technology of the capacitive converter can be fully incorporated with this. The capacitive converter is incorporated into a digitizing conversion process, in such a way that the receptor (e.g. a capacitor diaphragm), upon which the acoustic signal acts as sound pressure, is not deflected proportional to the signal strength, but according to the invention is kept almost in the rest state through a counter-acting sound signal or a counter force. The counter-signal is derived from the control variable of a control circuit, of which the sound receiver is a component, wherein the control variable contains the information on the acoustic signal. As compared to the known capacitor microphones and owing to the fact that the receptor for the most part remains in its reverberative rest state, characteristic errors that depend on the receptor position and lead to signal distortions, as well as mechanical self-resonances of the receptor that influence the frequency course and the impulse behavior of the electrical output signal for all practical purposes are no longer effective. Also, the invention practically no longer requires measures for a passive damping of the receptor, such as are required for linearizing known capacitor microphones by taking into account a reduction in the sensitivity, so that the sensitivity of a converter designed according to the invention is clearly improved. It is essential that the remaining slight deflections of the receptor are evaluated so as to provide only information on the direction of the deviation from the rest state and that this information is displayed as "zero" or "one." It means that the comparator function as elementary function of each analog/digital conversion process is carried out directly at the sound receptor, without requiring an analog intermediate signal obtained from the sound receiver.

BRIEF DESCRIPTION OF THE DRAWINGS

The invention is explained in further detail with the aid of the exemplary embodiments shown in the drawings, wherein.

DETAILED DESCRIPTION OF THE INVENTION

In FIGS. 1 to 4, the reference 1 denotes a sound source and the reference 2 a sound receiver, which can be at the same location or at different locations and can be based on the same or different electroacoustic converter principles. Essential is that two opposing, but equally strong forces simultaneously act upon the sound receptor of sound receiver 2, namely the force of the incoming active sound (acoustic signal) and the counter force of a counter-signal, generated by sound source 1, which results in the effect intended according to the invention of keeping the sound receptor for the most part in the rest state, despite the effect of the acoustic signal. Even the smallest deviation of the receptor from its rest state in positive or negative direction can be evaluated immediately as digital information "one" or "zero." Thus, the digital information is formed directly at the receptor for sound receiver 2.

The counter-signal is derived from the control variable of a sufficiently fast control circuit containing sound source 1 and sound receiver 2 as components, so that the sound source 1 can generate a counter-signal, which arrives simultaneously with the acoustic signal at the sound receiver and has the same value as the acoustic signal. The acoustic transit time or the structural distance between sound source 1 and sound receiver 2 here are crucial for determining the achievable frequency band width of the control circuit and should therefore be as small as possible, so as to ensure a stable control circuit operation for the complete audible frequency range. Consequently, it makes sense in practical operations to have sound source 1 and sound receiver 2 in the same location, which is equivalent to having the sound receptor (e.g. the diaphragm) of sound receiver 2 and the sounder of sound source 1 combined to form a single component, that is to say sound source 1 and sound receiver 2, for example, have a joint diaphragm. It is furthermore advantageous if sound source 1 and sound receiver 2 operate on the basis of different electroacoustic converter principles to avoid an undesirable electrical bypass and thus a cross-talk interference. For example, the sound source 1 can be realized electrostatically or magnetically and the sound receiver 2 as the capacitor of a high-frequency resonant circuit.

Figure 1:
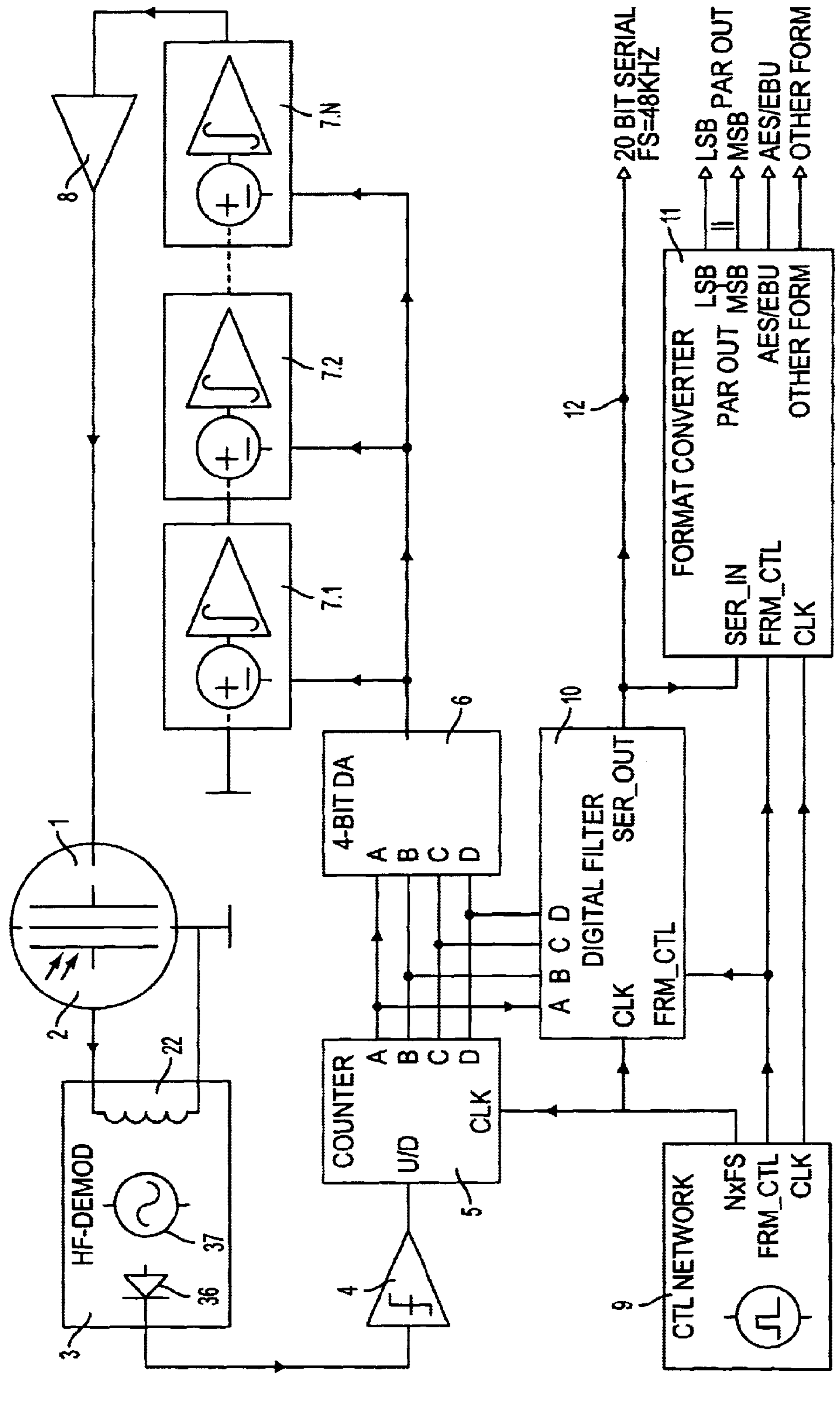
FIG. 1 shows a block diagram of a first embodiment of a digital microphone according to the invention.
Figure 2:
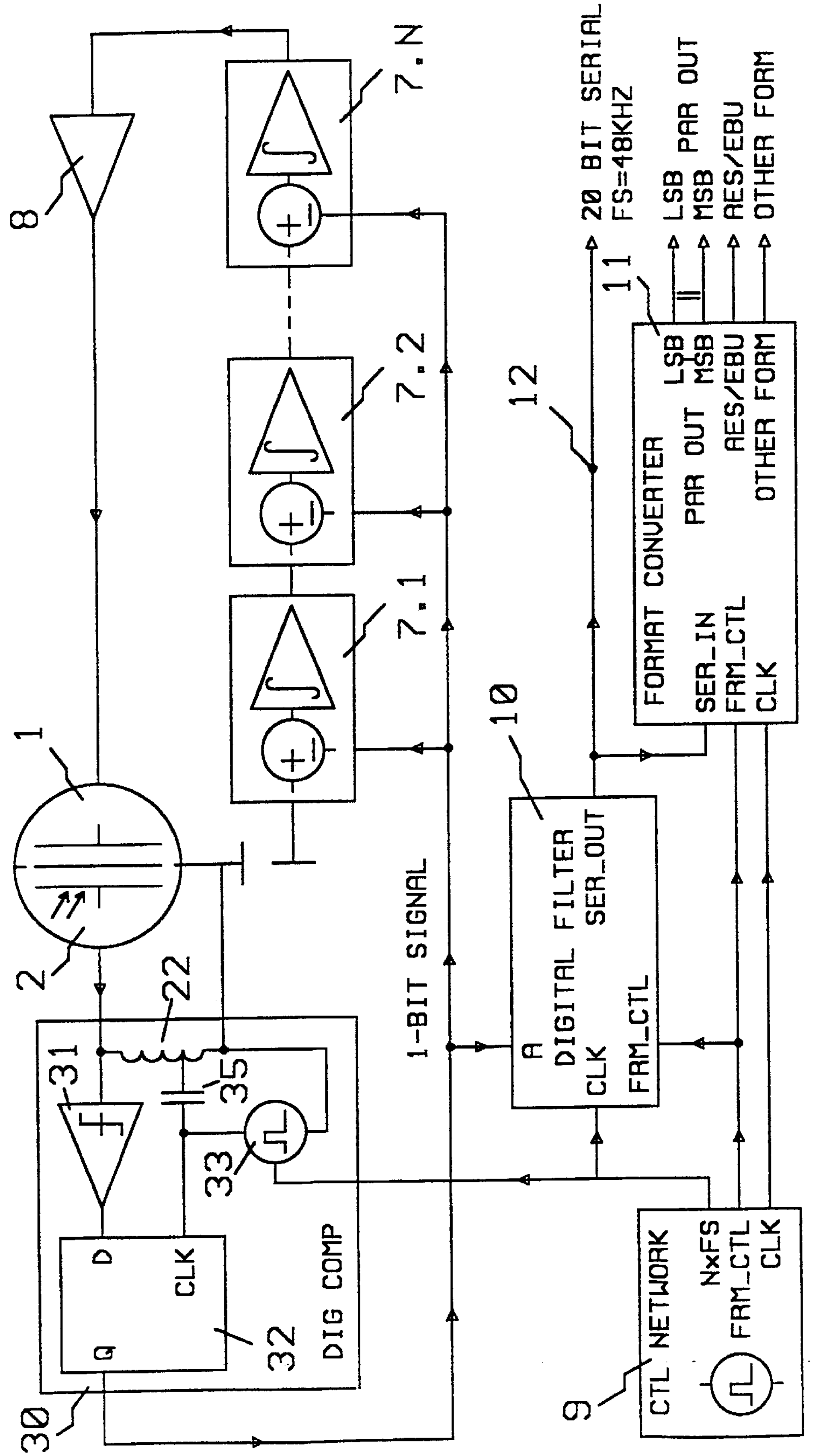
FIG. 2 shows a block diagram of a second embodiment of a digital microphone according to the invention.
Figure 3:
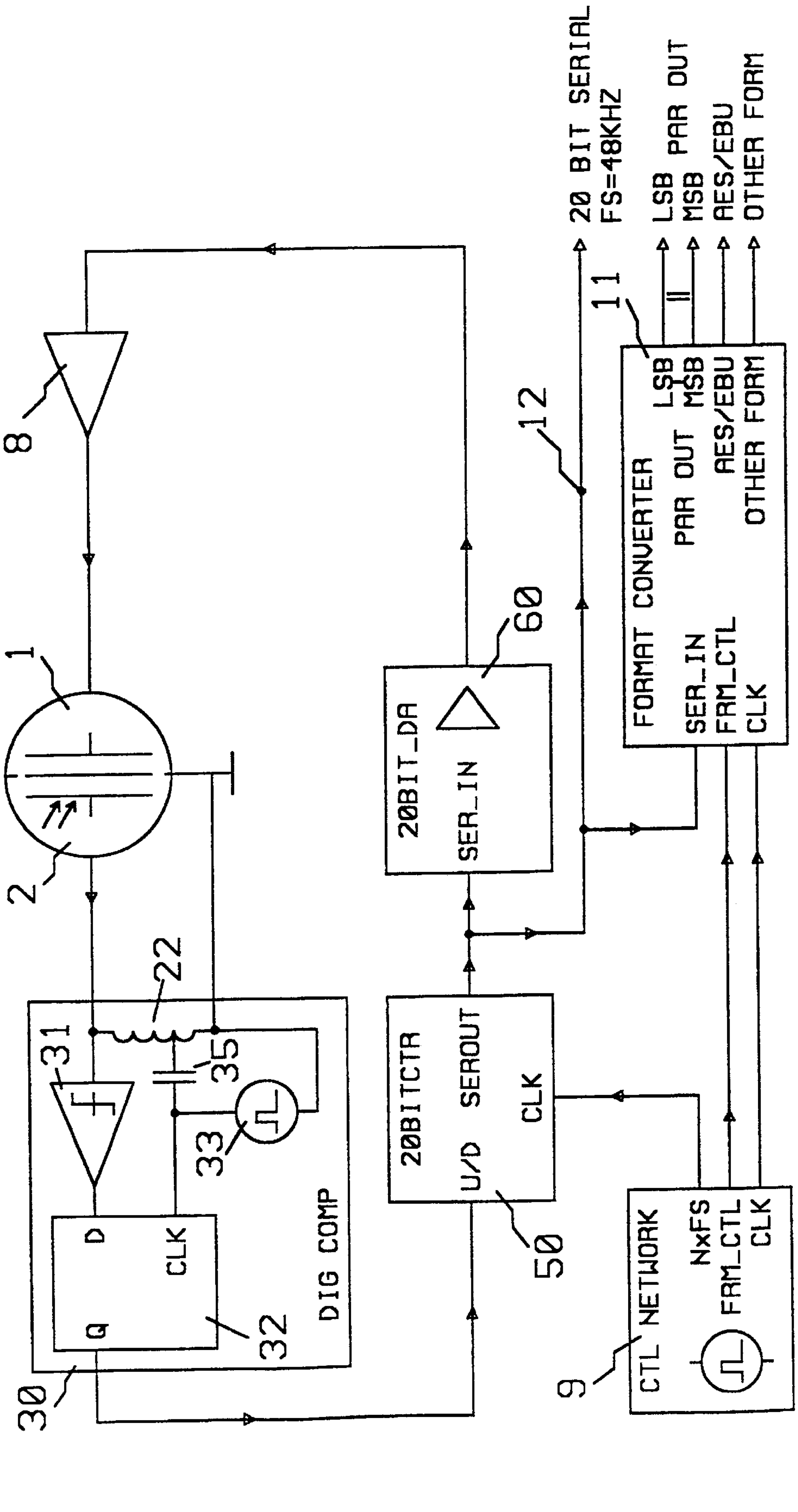
FIG. 3 shows a block diagram of a third embodiment of a digital microphone according to the invention.

The exemplary embodiments shown in FIGS. 1 to 3, differ in the manner in which the digital information, generated directly at the receptor for sound receiver 2, is evaluated as well as in the design of the control circuit.

In the embodiment according to FIG. 1, the control circuit is designed in the form of a modified Delta-Sigma modulator, e.g. as described in the magazine "Audio Professional," issue 3/4, 1995, pages 59 to 65.

Figure 4:
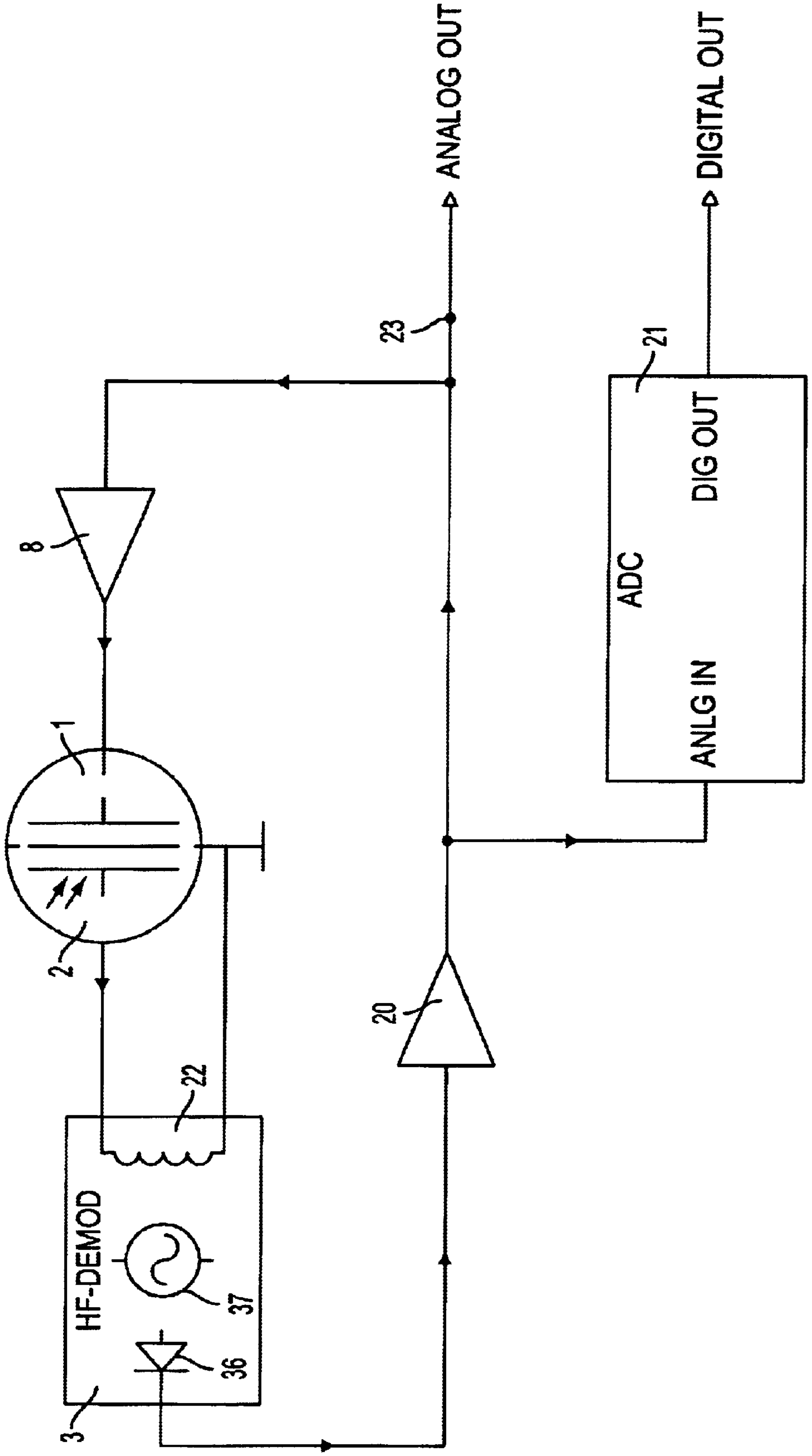
FIG. 4 shows a block diagram of a first embodiment of a digital microphone according to the invention.

The sound receiver 2 is realized in FIG. 1, as well as in all the other FIGS. 2 to 4, as capacitor of a high-frequency resonant circuit with resonant circuit inductivity 22. Owing to the incoming active sound, the joint diaphragm of the sound source/sound receiver combination ½ is initially deflected and detunes the HF resonant circuit through the changing capacity. The resonant circuit inductivity 22 is a component of a high-frequency demodulator 3 (phase demodulator or amplitude demodulator), which is indicated by a HF oscillator 37 and a demodulator diode 36 in the HF demodulator 3 unit. A long modulation characteristic, as is needed for traditional capacitor microphones, is not necessary for the HF demodulator 3 since it is only necessary to detect the correct mathematical signs relating to the deviations of the diaphragm for the sound source/sound receiver combination ½ in positive or negative direction, starting from the rest state. The HF demodulator 3 therefore can be designed to have a very high sensitivity, which is a considerable advantage with respect to the noise and dynamic behavior of the total system.

The output signal for HF demodulator 3 is supplied to a comparator 4, the output signal of which electrically represents the digital information that is generated directly at the receptor (diaphragm) for sound receiver 2, that is to say it reproduces the deviation in the diaphragm position in positive or negative direction as "0" signal or "1" signal. This digital signal represents a 1-bit word. In order to generate from this a multi-bit word, a 4-bit word for the example shown here, the output signal of comparator 4 controls the counting direction (up/down input) of a 4-stage counter 5. The clock input CLK of this counter is clocked by a clock generator 9 (CTL network), which is clocked, for example, with 64 times the scanning frequency (FS) of 48 kHz that is standard for the digitizing of audio signals. As a result of the excess scanning with 64 times 48 kHz (=3,072 MHZ), the time resolution of the 1-bit word, represented by the ratio of "zeros" to "ones," is increased corresponding to the degree of excess scanning. A 4-bit signal develops at the parallel outputs A, B, C and D of counter 5, which signal contains the information on the amplitude for the incoming acoustic signal at sound receiver 2. However, the quantization of the information is not only amplitude oriented (4-bit word). Owing to the excess scanning of the 1-bit word at the counter 5 input, the quantization of the information is also time-oriented, corresponding to the temporal relationship between various 4-bit words.

The 4-bit word at the parallel outputs of counter 5 is on the one hand supplied to a digital filter 10 and, on the other hand, to a 4-bit digital/analog converter 6. The 4-bit signal that has been converted to an analog signal is routed through a single-stage or multi-stage up-integration and difference formation by means of a chain of differencing and integrating stages 7.1 to 7.N, in order to statistically distribute the bit patterns, developed during the quantization process, in the frequency transmission range and to concentrate the quantization noise in a frequency range above the audible frequency range. The signal developing at the end of the chain of differencing and integrating stages 7.1 to 7.N is amplified in a driver amplifier 8, the output signal of which drives the sound source 1. The control circuit composed of components 2, 3, 4, 5, 6, 7.1 to 7.N, 8, and 1 is herewith closed. As previously mentioned, the forces acting upon the diaphragm as a result of the incoming sound are neutralized owing to the effect of this control signal.

The digital filter 10 with its parallel inputs A, B, C and D wherein the 4-bit word coming from the parallel outputs of counter 5 is present, is clocked with the same clocking frequency (3,072 MHz) as the counter 5. The filter 10 serializes the parallel 4-bit word, wherein a 20-bit signal 12 with a scanning frequency of 48 kHz appears at the output of digital filter 10 as a result of the 64-times excess scanning. A FIR filter preferably is provided as digital filter 10. Furthermore, the noise portions in the 4-bit output signal of counter 5, which are above the audible range, are effectively suppressed during the digital filtering.

It is understood that the serial digital 20-bit output signal 12 can also be converted to other optional data formats. With respect to this, FIG. 1 indicates a format converter 11 with a serial input SER.IN to which the signal 12 is supplied. The clocking input CLK and an additional input FRM CTL for the synchronizing of words, are connected to the clock generator 9. The optionally provided format converter 11 generates a parallel output signal at its multiple outputs, of which the first one is given the designation LSB (corresponding to least significant bit) and the last one the designation MSB (corresponding to most significant bit). The format converter 11 furthermore has an output AES/EBU for an AES/EBU interface, as well as a free output OTHER FORM for selecting a different digital format.

In a modification of the embodiment according to FIG. 1, the control circuit can be designed as a 1-bit converter, so that by omitting the counter 5, the comparator 4 output is connected directly to the chain of differencing and integrating stages 7.1 to 7.N. Furthermore, it is not necessary to first demodulate the modulated HF oscillation and then digitize it (by means of HF demodulator 3 with series-connected comparator 4). Rather, it can be converted directly to a (digital) 1-bit signal in a stage 30, as shown in FIGS. 2 and 3. The stage 30 contains a limiter amplifier or comparator 31, which converts the phase-modulated HF oscillation at the resonant circuit coil 22 directly to a square-wave signal with digital logic level. A further component is the phase-locked HF clock oscillator 33, which stimulates the resonant circuit, consisting of the capacitive sound receiver 2 and the resonant circuit coil 22, via the coupling capacitor 35, and which is synchronized by the clock oscillator 9, if necessary. The 1-bit signal sequence is generated directly through a digital phase comparison between the digitized HF oscillation and the HF clock oscillator 33, which signal sequence carries the information of the sound receptor deflection from the rest state. In the embodiment under review, in FIGS. 2 and 3, this function is executed by a D-FlipFlop. The 1-bit signal is subsequently reqad into the digital filter 10 with the necessary excess scanning, from which the desired quantization of the active signal results, and is then supplied to the differencing and integrating stages 7.1 to 7.N.

The embodiment according to FIG. 3 differs from the embodiment according to FIG. 2 in that the differentiating and integrating stages 7.1 to 7.N with digital filter 10, which are typical for a Delta-Sigma converter, are omitted and are replaced by a high-resolution digital/analog converter 60, so that the control circuit is closed once more. In that case, the digital output signal 12 develops directly at the output for digital/analog converter 50, which signal is shown as a serial signal in the example viewed, and which can be converted in the format converter 11 to optionally formatted, digital output signals in the previously described manner.

FIG. 4 shows an improved analog microphone, so to speak as a "byproduct" of the digital microphone according to FIGS. 1 to 3, for which only the sound receiver/sound source combination ½, the HF demodulator 3, and the driver amplifier 8 were retained as compared to the circuit arrangement according to FIG. 1. The demodulated HF signal (with a very small amplitude) at the output of HF demodulator 3 is amplified simply by means of an amplifier 20 in order to form an analog, high-quality microphone output signal 23. Furthermore, the driver signal for driving the sound source 1 is generated in amplifier 9 from the output signal 23. If desired, the analog output microphone-output signal 23 can be converted to a digital signal by means of a traditional analog/digital converter 21, which digital signal is shown as a serial signal in the embodiment shown here. Of the advantages of the "true" digital microphone according to FIGS. 1 to 3, the digital microphone according to FIG. 4, which is reconfigured as an analog microphone, retains the advantages of an insignificant sound receptor deflection and therewith connected, above-explained improvements with respect to linear and non-linear distortions, as well as the sensitivity, provided the amplifier 20 is designed to provide a sufficiently high amplification. With an amplification factor of 100 for amplifier 20, for example, the diaphragm deflection of the sound receiver 2, as well as the electrical output signal of sound receiver 2 are reduced by a corresponding measure.

What is claimed is:

1. A method of converting an acoustic signal to an electrical signal, the acoustic signal acting upon a sound receptor of a sound receiver, the method comprising the steps of:

generating at least one digital information signal when the acoustic signal acts upon the sound receptor;

processing said at least one digital information signal in a control circuit to obtain a control variable, wherein the control circuit includes the sound receiver;

generating a counter-signal based on the control variable; and applying the counter-signal to the sound receptor, wherein the counter-signal acts to neutralize forces exerted upon the sound receptor by the acoustic signal, whereby the sound receptor is made to remain primarily in an equilibrium state.

2. The method according to claim 1, wherein the step of generating a counter-signal comprises the step of coupling the control variable to a sound source, wherein the sound source is acoustically coupled to the sound receiver.

3. The method according to claim 1, wherein the counter-signal is generated by a sound source, and wherein the sound receptor is provided to function simultaneously as a sound-receiving and sound-emitting component of a sound source/sound receiver combination.

4. The method according to claim 1, wherein the sound receptor comprises a diaphragm.

5. The method according to claim 1, wherein the sound receptor comprises at least one of a resiliently positioned component and a component designed as a spring.

6. The method according to claim 1, wherein the step of generating a counter-signal comprises the step of coupling the control variable to a sound source, and wherein the sound source and the sound receiver are designed according to electro-acoustic converter principles.

7. The method according to claim 1, wherein the step of generating at least one digital information signal comprises the step of:

converting sound receptor deflections to a digital signal using a comparator.

8. The method according to claim 7, wherein the step of generating a counter-signal comprises the step of:

converting the digital signal to an analog signal using a digital/analog converter.

9. The method according to claim 7, wherein the step of processing comprises the step of:

filtering the digital information signal in such a way that time information is transformed to amplitude information.

10. The method according to claim 9, wherein the step of filtering the digital information signal comprises the step of using a digital filter to filter the digital information signal.

11. The method according to claim 9, further comprising the step of:

converting the filtered digital information signal to a different data format.

12. The method according to claim 11, wherein the step of filtering the digital information signal comprises the step of using a digital filter to filter the digital information signal.

13. The method according to claim 1, wherein the control circuit operates based on the principle of a Delta-Sigma modulator, and wherein the receptor is included in a comparator function of the Delta-Sigma modulator.

14. The method according to claim 13, wherein the Delta-Sigma modulator is a one-bit Delta-Sigma modulator.

15. The method according to claim 13, wherein the Delta-Sigma modulator is a multi-bit Delta-Sigma modulator.

16. The method according to claim 1, further comprising the step of:

modulating at least one of the phase and amplitude of an HF signal generated by a resonant circuit, a capacitative component of which is the sound receiver, when the acoustic signal acts upon the sound receptor.

17. The method according to claim 16, further comprising the step of:

demodulating the HF signal using an HF demodulator.

18. The method according to claim 16, wherein the HF signal is phase modulated, and further comprising the steps of:

directly digitizing the phase-modulated HF signal using a limiter comparator; and converting the directly digitized phase-modulated HF signal directly to a digital signal carrying information from the sound receptor using a phase comparator.

19. A method of converting an acoustic signal to an electrical signal, the acoustic signal acting upon a sound receptor of a sound receiver, the method comprising the steps of:

generating an analog electrical signal in response to the acoustic signal acting upon the sound receptor;

amplifying the analog electrical signal to produce an amplified analog signal;

supplying the amplified analog signal to a sound source to generate a counter-signal; and applying the counter-signal to the sound receptor, wherein the counter-signal acts to neutralize forces exerted upon the sound receptor by the acoustic signal, whereby the sound receptor is made to remain primarily in an equilibrium state.

20. The method according to claim 19, further comprising the step of:

converting the amplified analog signal to a digital signal.

21. A sound receiving apparatus comprising:

a sound receiver having a sound receptor;

means for generating an electrical signal when an acoustic signal acts upon the sound receptor;

a control circuit for processing the electrical signal, wherein the control circuit includes the sound receiver, the control circuit generating a control variable;

means for generating a counter-signal based on the control variable; and means for applying the counter-signal to the sound receptor, the counter-signal acting to maintain the sound receptor primarily in an equilibrium state by neutralizing forces exerted upon the sound receptor by the acoustic signal.

22. The apparatus according to claim 21, wherein the means for applying the counter-signal to the sound receptor comprises a sound source.

23. The apparatus according to claim 22, wherein the sound receptor functions simultaneously as a sound-receiving component and as a sound-emitting component of a sound source/sound receiver combination.

24. The apparatus according to claim 21, wherein the sound receptor comprises a diaphragm.

25. The apparatus according to claim 21, wherein the sound receptor comprises at least one of a resiliently positioned component or a component configured as a spring.

26. The apparatus according to claim 21, further comprising:

a comparator for converting sound receptor deflections to a digital signal.

27. The apparatus according to claim 26, further comprising:

a digital-to-analog converter for converting the digital signal into an analog signal.

28. The apparatus according to claim 21, the control circuit operating on the principle of a Delta-Sigma modulator, wherein the sound receptor is included in a comparator function of the Delta-Sigma modulator.

29. The apparatus according to claim 21, wherein the means for generating an electrical signal comprises:

an HF resonant circuit generating an HF signal, the HF resonant circuit including a capacitative component, wherein the sound receptor modulates the HF signal.

30. The apparatus according to claim 29, wherein the HF resonant circuit includes said sound receiver as the capacitative component.

31. The apparatus according to claim 29, further comprising:

an HF demodulator, coupled to the HF resonant circuit, for demodulating the modulated HF signal.

32. The apparatus according to claim 29, wherein the type of modulation is phase modulation, and further comprising:

a limiter comparator for digitizing the phase-modulated HF signal to produce a digitized HF signal; and a digital phase converter for converting the digitized HF signal to a digital signal containing information received from the sound receptor.

33. The apparatus according to claim 21, wherein the control circuit includes a digital filter processing a digital signal to produced a filtered digital signal, so as to convert time information into amplitude information.

34. The apparatus according to claim 33, wherein the digital filter comprises an FIR filter.

35. The apparatus according to claim 33, wherein the control circuit further includes:

means for converting the filtered digital signal to a different data format.

36. The apparatus according to claim 35, wherein the digital filter comprises an FIR filter.

37. The apparatus according to claim 21, wherein the means for generating an electrical signal generates an analog signal, wherein the control circuit comprises an amplifier for amplifying the analog signal to produce an amplified signal, and wherein the means for generating a counter-signal comprises a sound source to which the amplified signal is directly applied.

38. The apparatus according to claim 37, further comprising:

means for converting the amplified signal into a digital signal.

* * * * *